(12) United States Patent
Schulz et al.

(10) Patent No.: US 9,850,934 B2
(45) Date of Patent: Dec. 26, 2017

(54) SELF-REINFORCING CLIP

(71) Applicants: Stefan Schulz, Lorrach (DE); Jan Stickelberger, Lorrach (DE); Melanie Anna, Rheinfelden (DE); Michael Danby, Stoney Creek (CA); Virginie Pouzols, Huningue (FR); Richard Geist, Southfield, MI (US)

(72) Inventors: Stefan Schulz, Lorrach (DE); Jan Stickelberger, Lorrach (DE); Melanie Anna, Rheinfelden (DE); Michael Danby, Stoney Creek (CA); Virginie Pouzols, Huningue (FR); Richard Geist, Southfield, MI (US)

(73) Assignee: A. RAYMOND ET CIE, Grenoble (FR)

(*) Notice: Subject to any disclaimer, the term of this patent is extended or adjusted under 35 U.S.C. 154(b) by 38 days.

(21) Appl. No.: 15/062,673

(22) Filed: Mar. 7, 2016

(65) Prior Publication Data
US 2017/0254350 A1 Sep. 7, 2017

(51) Int. Cl.
| | |
|---|---|
| *F16B 19/00* | (2006.01) |
| *F16B 21/08* | (2006.01) |
| *F16B 5/06* | (2006.01) |
| *F16B 5/12* | (2006.01) |

(52) U.S. Cl.
CPC ......... *F16B 21/086* (2013.01); *F16B 5/0642* (2013.01); *F16B 5/12* (2013.01)

(58) Field of Classification Search
CPC .. F16B 2/00; F16B 5/0642; F16B 5/12; F16B 19/00; F16B 21/086

USPC ............... 411/508, 510, 547, 913, 918; 24/293–295; 296/37.7
See application file for complete search history.

(56) References Cited

U.S. PATENT DOCUMENTS

| | | | | |
|---|---|---|---|---|
| 2,077,120 A | * | 4/1937 | Lombard | ............... F16B 5/125 |
| | | | | 220/DIG. 3 |
| 2,137,210 A | * | 11/1938 | Lombard | ............. F16B 21/086 |
| | | | | 24/453 |
| 2,521,317 A | | 9/1950 | Brown | |
| 2,655,072 A | | 10/1953 | Poupitch | |

(Continued)

FOREIGN PATENT DOCUMENTS

| | | |
|---|---|---|
| EP | 0101260 A2 | 2/1984 |
| FR | 2572144 A1 | 4/1986 |

(Continued)

*Primary Examiner* — Roberta Delisle
(74) *Attorney, Agent, or Firm* — Dickinson Wright PLLC

(57) ABSTRACT

A self-reinforcing clip for securing a panel to a hole. The self-reinforcing clip comprises a first support member and a second support member each disposed in spaced relationship with one another and defining a gap therebetween. Each of the support members have a body portion and a flange portion. At least one tooth extends outwardly from at least one of the body portions for engaging an inner wall of the hole. At least one of the support members defines a contact surface. Further, at least one cross-over member is coupled to at least one of the support members and extends across the gap past the body portion of the other support member in alignment with the contact surface for engaging the contact surface for inhibiting movement of the support members toward one another when upward forces attempt to pull the clip from the hole.

22 Claims, 10 Drawing Sheets

(56) References Cited

U.S. PATENT DOCUMENTS

| | | | |
|---|---|---|---|
| 2,692,414 A * | 10/1954 | Poupitch | F16B 5/125 24/293 |
| 3,024,509 A | 3/1962 | Hamann | |
| 3,783,922 A | 1/1974 | Petrus | |
| 3,864,789 A * | 2/1975 | Leitner | B60R 13/04 24/293 |
| 4,043,579 A | 8/1977 | Meyer | |
| 4,354,782 A | 10/1982 | Newport | |
| 4,430,033 A | 2/1984 | McKewan | |
| 4,444,372 A | 4/1984 | Klingstedt et al. | |
| 4,609,170 A | 9/1986 | Ludwig | |
| 4,630,338 A | 12/1986 | Osterland et al. | |
| 5,542,158 A | 8/1996 | Gronau, et al. | |
| 5,593,263 A * | 1/1997 | Clinch | B60R 13/0206 411/173 |
| 5,762,299 A | 6/1998 | Motsch | |
| 5,887,319 A | 3/1999 | Smith | |
| 5,927,920 A | 7/1999 | Swanstrom | |
| 6,074,150 A * | 6/2000 | Shinozaki | B60R 13/0206 24/297 |
| 6,141,837 A * | 11/2000 | Wisniewski | F16B 5/0614 24/289 |
| 6,289,560 B1 | 9/2001 | Guyot | |
| 6,353,981 B1 * | 3/2002 | Smith | F16B 2/241 24/289 |
| 6,718,599 B2 * | 4/2004 | Dickinson | F16B 5/0614 24/289 |
| 6,928,705 B2 * | 8/2005 | Osterland | B60R 13/0206 24/289 |
| 7,188,392 B2 * | 3/2007 | Giugliano | F16B 5/065 24/295 |
| 7,287,945 B2 | 10/2007 | Lubera et al. | |
| 7,428,770 B2 * | 9/2008 | Dickenson | F16B 5/0614 24/289 |
| 7,496,993 B2 | 3/2009 | Kosidlo et al. | |
| 7,637,527 B2 | 12/2009 | Mazanek et al. | |
| 7,640,634 B2 | 1/2010 | Vassiliou | |
| 7,725,991 B2 | 6/2010 | Lubera et al. | |
| 9,009,928 B2 | 4/2015 | Binkert | |
| 2001/0022923 A1 | 9/2001 | Arisaka | |
| 2001/0053319 A1 | 12/2001 | Swanstrom et al. | |
| 2003/0024078 A1 | 2/2003 | Vassiliou | |
| 2003/0042791 A1 | 3/2003 | Weng et al. | |
| 2005/0236861 A1 | 10/2005 | Slobodecki et al. | |
| 2010/0107372 A1 | 5/2010 | Reznar | |
| 2011/0058915 A1 | 3/2011 | Scroggie et al. | |
| 2011/0116890 A1 | 5/2011 | Okada et al. | |
| 2011/0314646 A1 | 12/2011 | Ribes Marti | |

FOREIGN PATENT DOCUMENTS

| | | |
|---|---|---|
| FR | 2785339 A1 | 5/2000 |
| GB | 635670 A | 4/1950 |
| GB | 1357447 A | 6/1974 |
| GB | 2246595 A | 2/1992 |
| WO | 2015044417 A1 | 4/2015 |

* cited by examiner

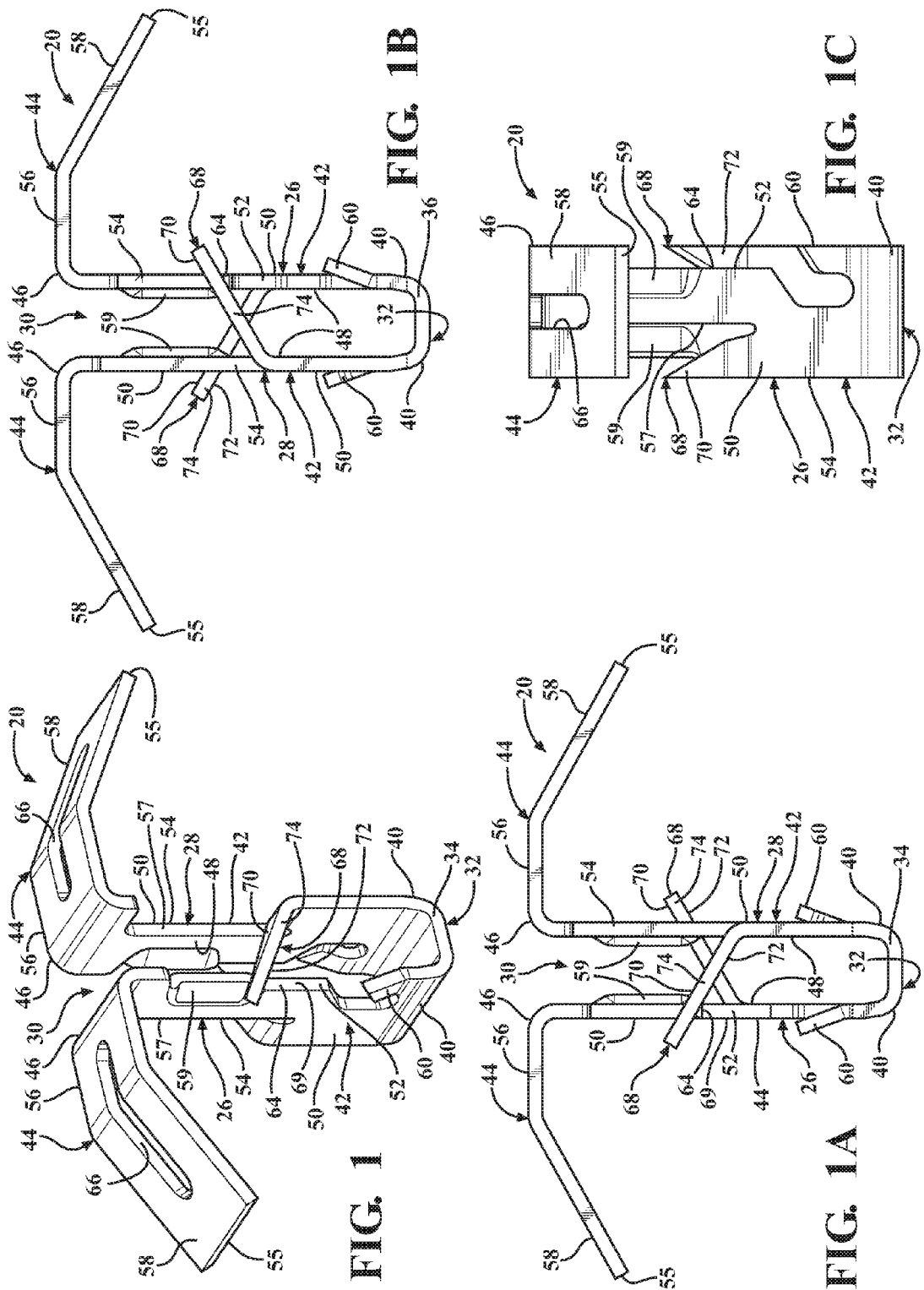

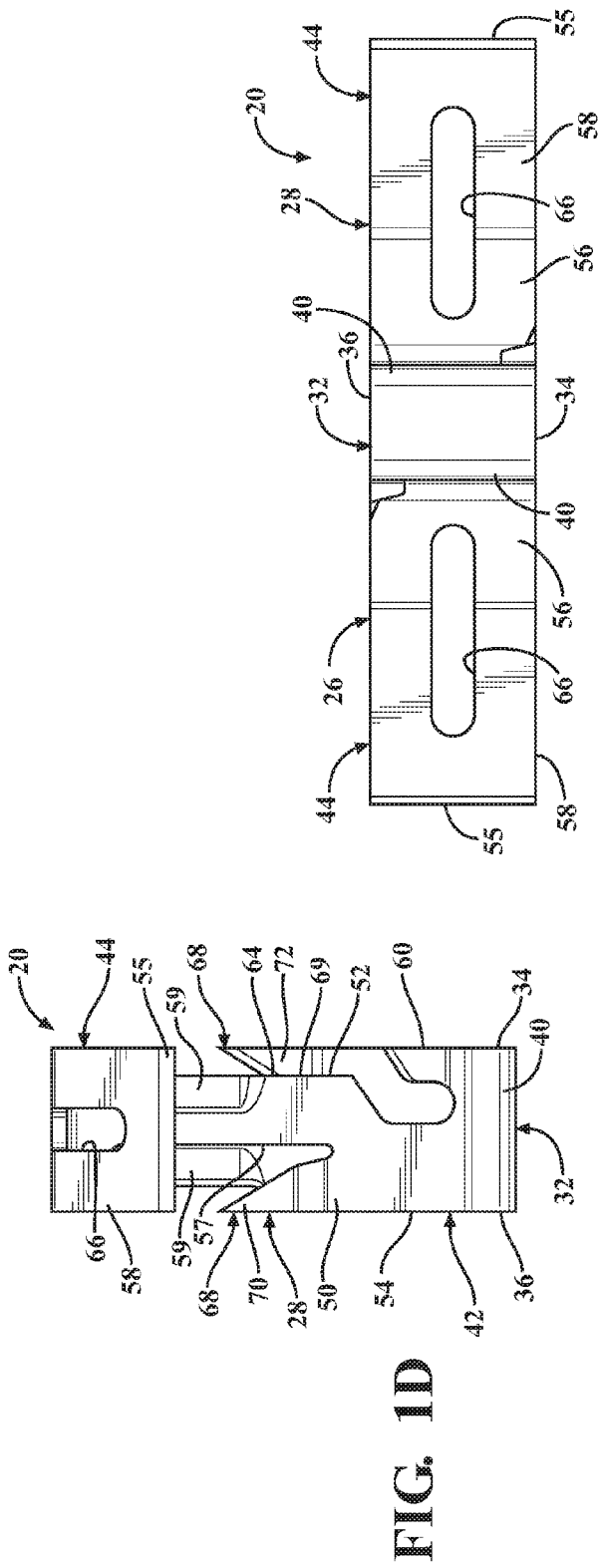
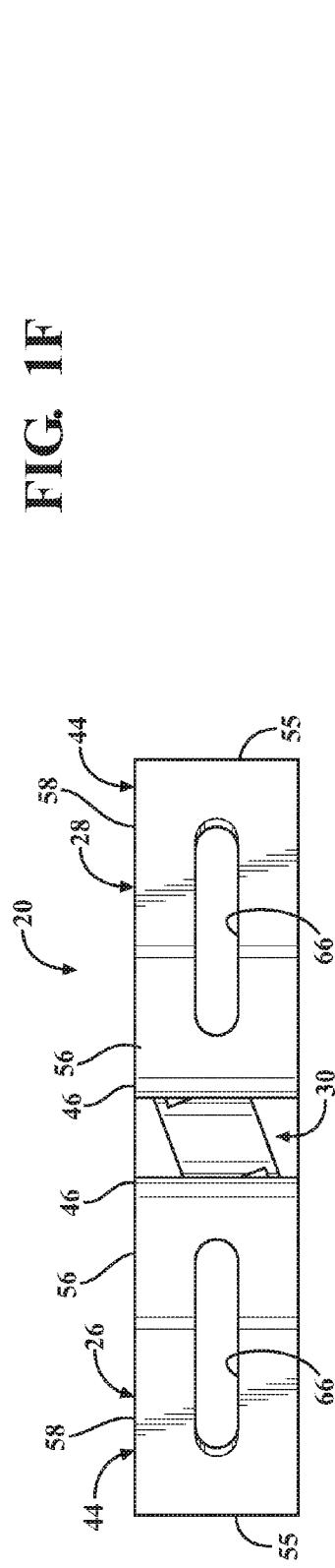
FIG. 1D
FIG. 1E
FIG. 1F

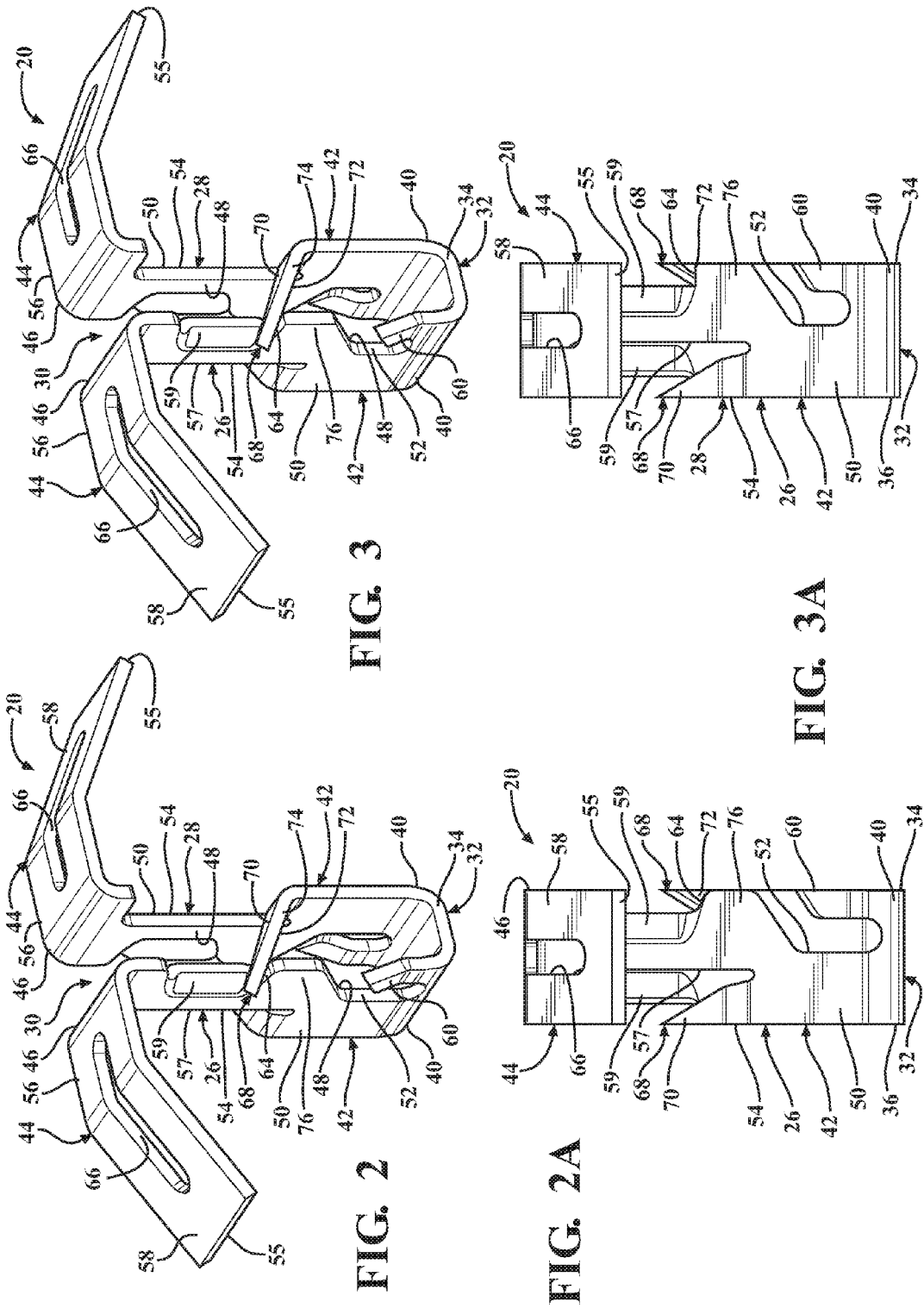

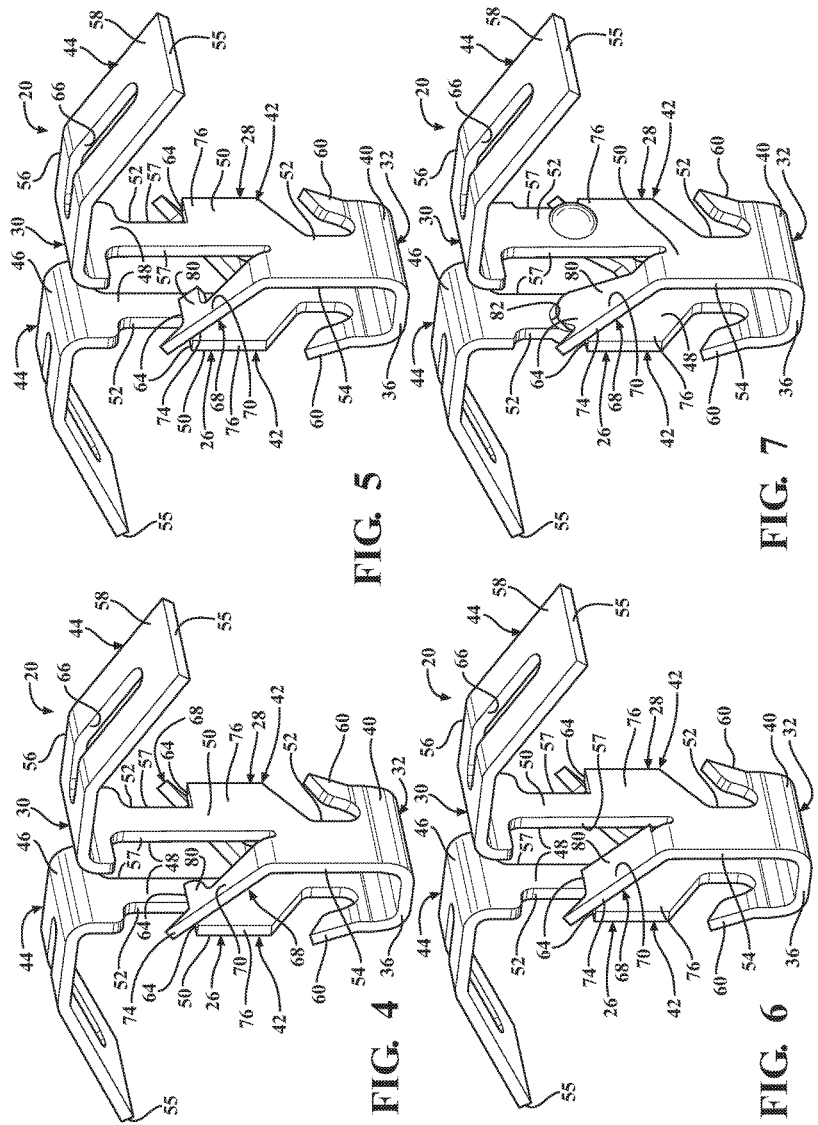

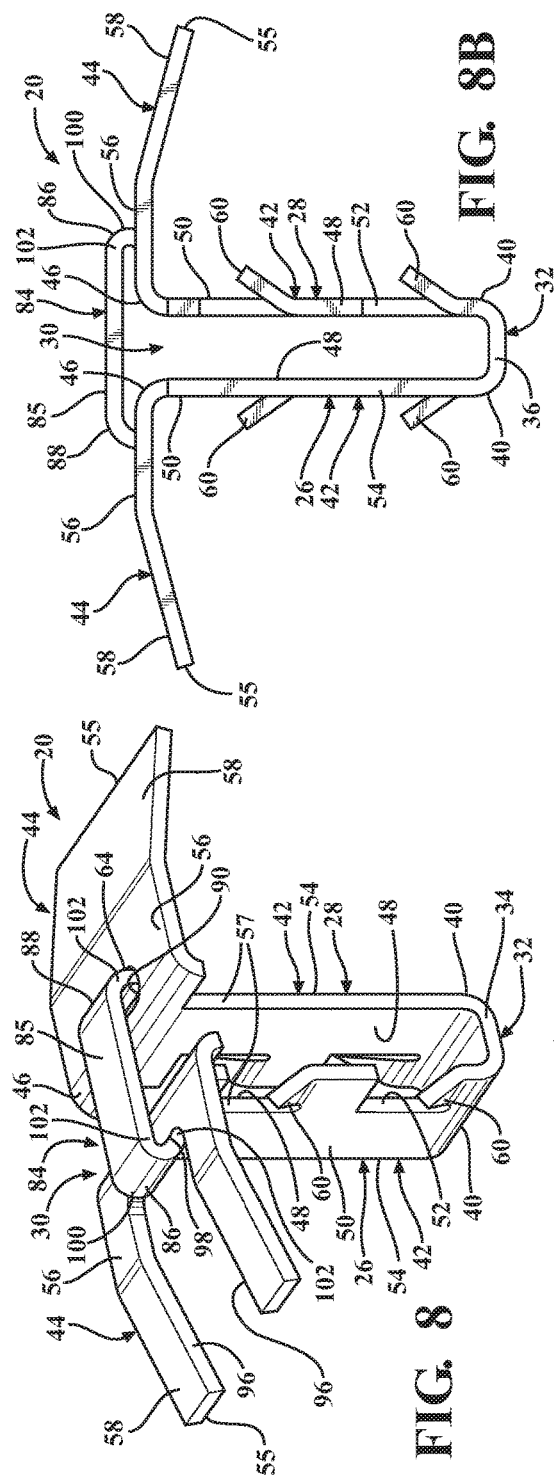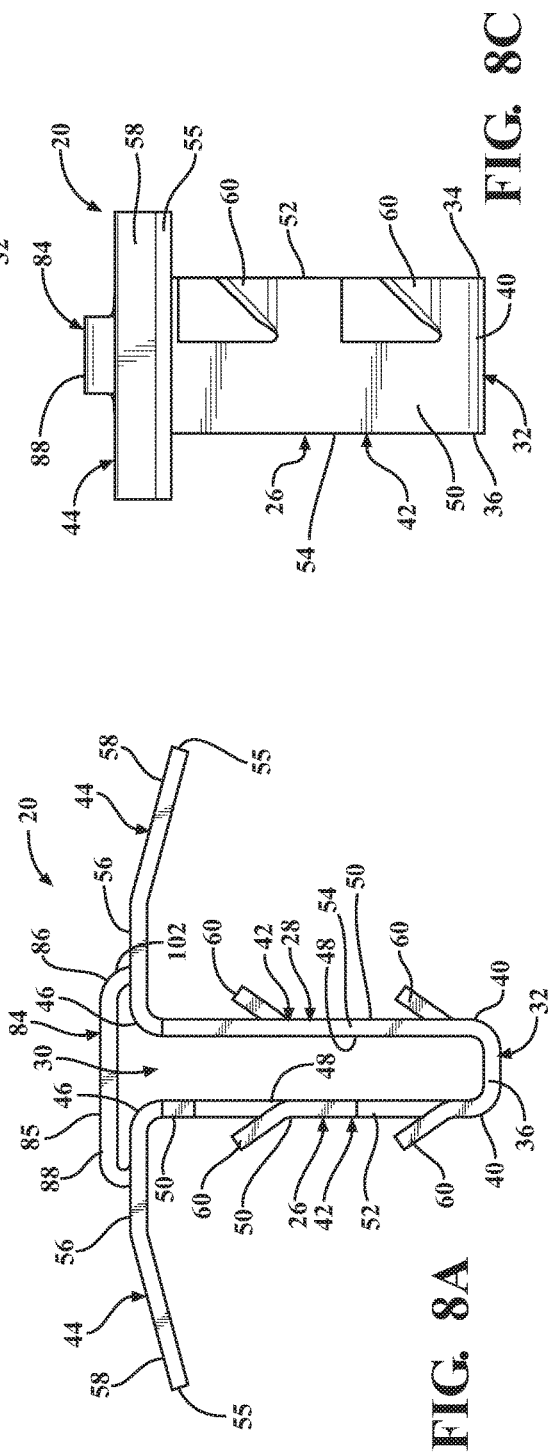

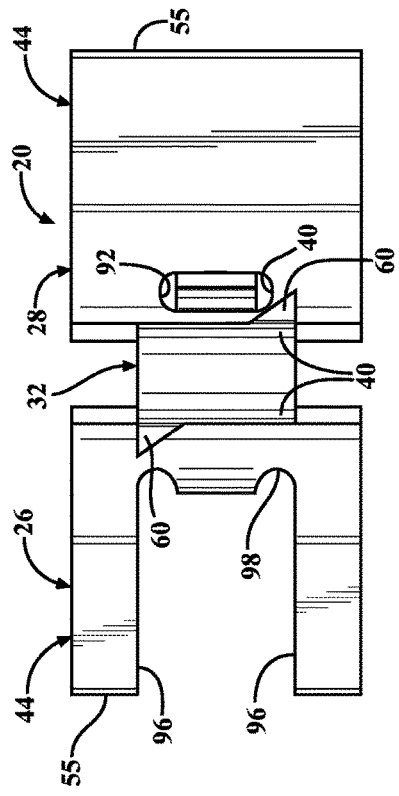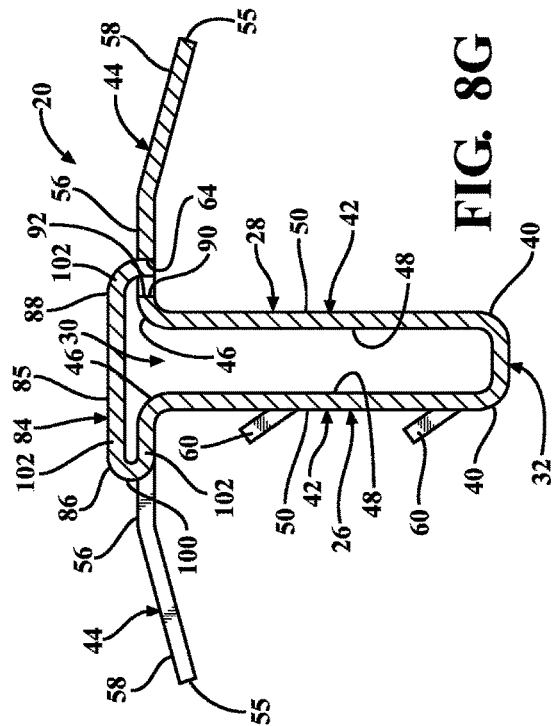

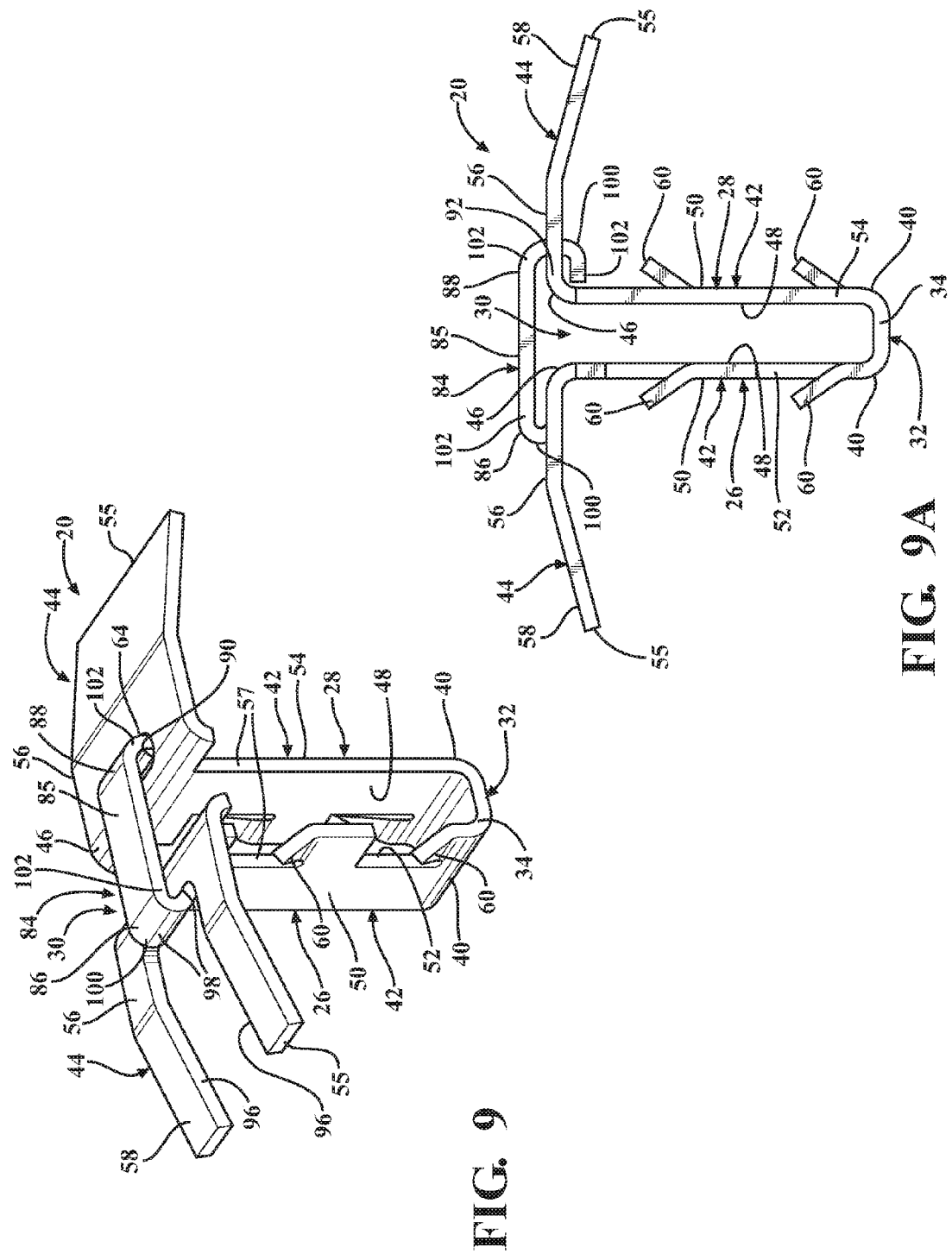

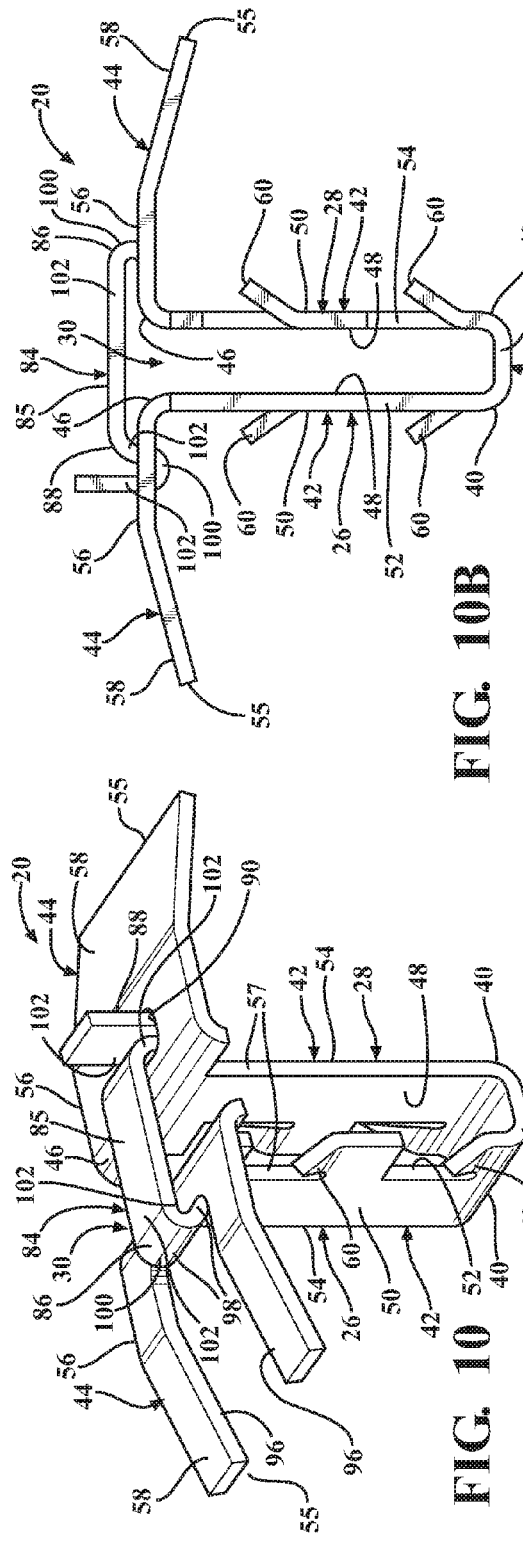
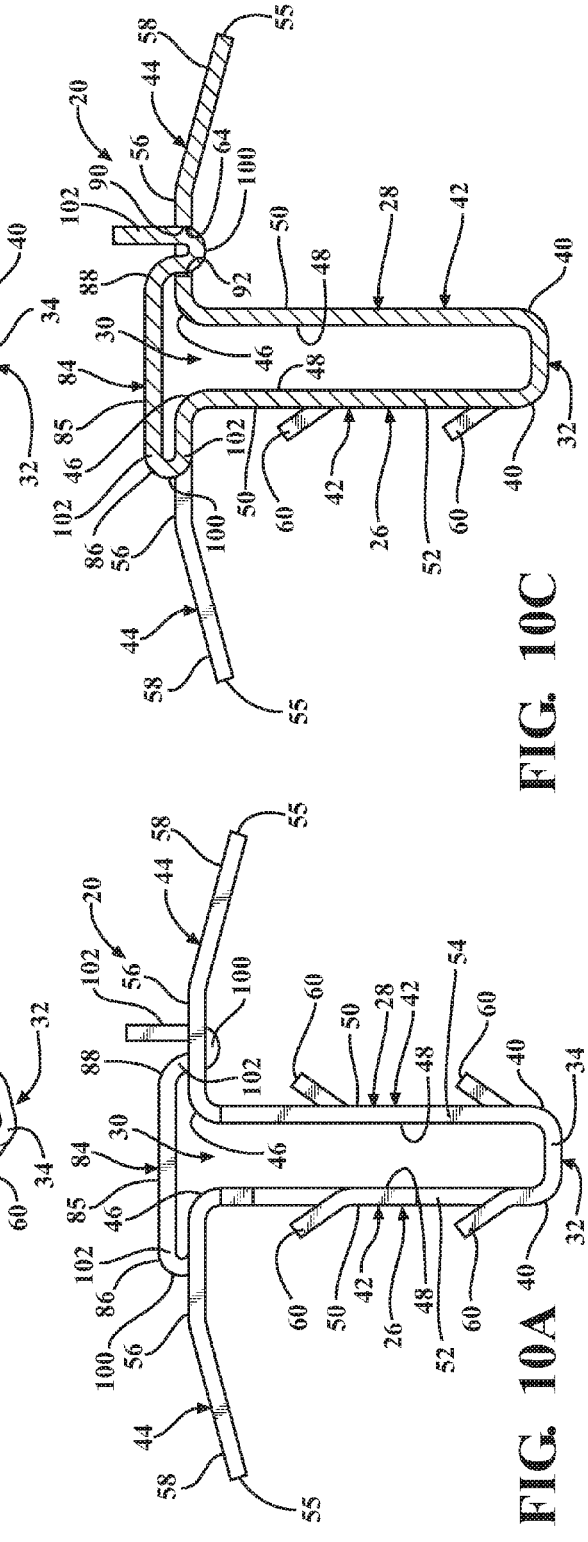
FIG. 10
FIG. 10A
FIG. 10B
FIG. 10C

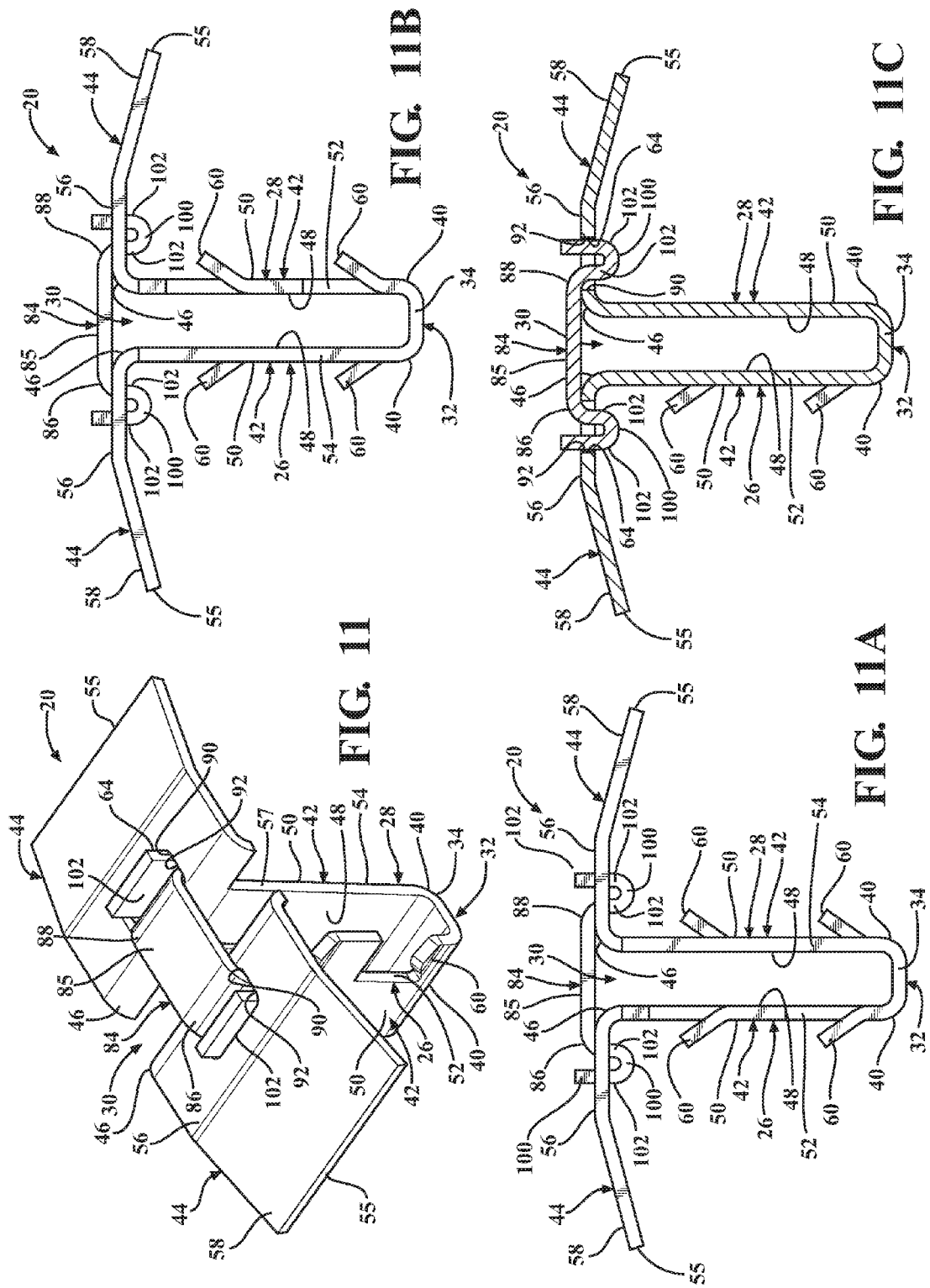

SELF-REINFORCING CLIP

FIELD OF THE INVENTION

A self-reinforcing clip for securing a panel to a hole.

BACKGROUND OF THE INVENTION

Fasteners are used in various industries, including the automotive industry, to retain panels to other components. For example, a fastener may be utilized to retain a vehicle door trim panel to a supporting metal sheet of the door.

Specific fasteners have been developed for securing panels to blind holes, i.e., holes that are drilled, or otherwise formed to a specific depth in a component without breaking through to the opposing side of the component. Conventional fasteners for blind holes often require the use of specialized tools to tighten the fastener within the blind hole and/or to prepare the blind hole for the reception of the fastener. Furthermore, conventional fasteners are known to be easily forced out of the blind hole upon the exertion of a relatively small force against the fastener or panel. Accordingly, there remains a need for an improved fastener for securing panels to blind holes.

SUMMARY OF THE INVENTION

A self-reinforcing clip for securing a panel to a hole. The self-reinforcing clip comprises a first support member and a second support member, each disposed in spaced relationship with one another and defining a gap therebetween. A base interconnects the first and second support members. Each of the support members have a body portion and a flange portion, with the flange portions extending outwardly away from one another. At least one tooth extends outwardly from the body portion of at least one of the support members and upwardly toward the flange portion for engaging an inner wall of the hole to resist removal of the reinforcing clip from the hole. At least one of the support members defines a contact surface. Further, at least one cross-over member is coupled to at least one of the support members and extends across the gap past the body portion of the other support member in alignment with the contact surface on the other support member for engaging the contact surface for inhibiting movement of the support members toward one another when upward forces attempt to pull the clip from the hole.

In accordance with the foregoing and other aspects of the disclosure, a self-reinforcing clip is provided that has improved structural rigidity, thus allowing the clip to remain secured in the hole even upon the application of external forces against the fastener and/or panel being retained by the clip.

According to another aspect of the disclosure, a self-reinforcing clip is provided that improves its structural rigidity and further secures itself in the hole upon the application of external forces against the clip.

According to a further aspect of the disclosure, a self-reinforcing clip is provided that may be positioned in the hole by way of hand force only. More specifically, the clip does not require the use of a specialized tool to fasten the clip in position and the clip requires a relatively small insertion force to be positioned in the hole.

According to yet another aspect of the disclosure, the self-reinforcing clip may be made of a single piece of material, such as sheet metal, thus providing for inexpensive material and manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of a self-reinforcing clip according to an aspect of the disclosure having a barb-style cross-over member, and a contact surface defined by an edge of a body portion of a support member;

FIG. 1A is a front view of the self-reinforcing clip of FIG. 1;

FIG. 1B is a back view of the self-reinforcing clip of FIG. 1;

FIG. 1C is a side view of the self-reinforcing clip of FIG. 1;

FIG. 1D is a side view of the self-reinforcing clip of FIG. 1;

FIG. 1E is a top view of the self-reinforcing clip of FIG. 1;

FIG. 1F is a bottom view of the self-reinforcing clip of FIG. 1;

FIG. 2 is a perspective view of a self-reinforcing clip according to an aspect of the disclosure having a barb-style cross-over member, and a contact surface defined by a rounded and tapered stopping projection;

FIG. 2A is a side view of the self-reinforcing clip of FIG. 2;

FIG. 3 is a perspective view of a self-reinforcing clip according to an aspect of the disclosure having a barb-style cross-over member, and a contact surface defined by a tapered stopping projection with planar sides;

FIG. 3A is a side view of the self-reinforcing clip of FIG. 3;

FIG. 4 is a perspective view of a self-reinforcing clip according to an aspect of the disclosure including a barb-style cross-over member having a quarter-circle shaped protuberance extending therefrom for engaging a contact surface;

FIG. 5 is a perspective view of a self-reinforcing clip according to an aspect of the disclosure including a barb-style cross-over member having a generally square shaped protuberance extending therefrom for engaging a contact surface;

FIG. 6 is a perspective view of a self-reinforcing clip according to an aspect of the disclosure including a barb-style cross-over member having a generally rectangular shaped protuberance extending therefrom for engaging a contact surface;

FIG. 7 is a perspective view of a self-reinforcing clip according to an aspect of the disclosure including a barb-style cross-over member having a generally semi-circular shaped protuberance extending therefrom for engaging a contact surface;

FIG. 8 is a perspective view of a self-reinforcing clip according to an aspect of the disclosure including a bridge member style cross-over member having a downwardly extending arm at a distal section of the cross-over member;

FIG. 8A is a front view of the self-reinforcing clip of FIG. 8;

FIG. 8B is a back view of the self-reinforcing clip of FIG. 8;

FIG. 8C is a side view of the self-reinforcing clip of FIG. 8;

FIG. 8D is a side view of the self-reinforcing clip of FIG. 8;

FIG. 8E is a top view of the self-reinforcing clip of FIG. 8;

FIG. 8F is a bottom view of the self-reinforcing clip of FIG. 8;

FIG. 8G is a cross-sectional side view of the self-reinforcing clip of FIG. 8;

FIG. 9 is a perspective view of a self-reinforcing clip according to an aspect of the disclosure including a bridge member style cross-over member having a U-shaped distal section having arms that extend generally perpendicularly to the body portion of the support member;

FIG. 9A is a side view of the self-reinforcing clip of FIG. 9;

FIG. 10 is a perspective view of a self-reinforcing clip according to an aspect of the disclosure including a bridge member style cross-over member having a U-shaped distal section having arms that extend generally parallel to the body portion of the support member;

FIG. 10A is a side view of the self-reinforcing clip of FIG. 10;

FIG. 10B is a side view of the self-reinforcing clip of FIG. 10;

FIG. 10C is a cross-sectional side view of the self-reinforcing clip of FIG. 10;

FIG. 11 is a perspective view of a self-reinforcing clip according to an aspect of the disclosure including a removable bridge member style cross-over member having generally U-shaped proximal and distal sections, each having arms that extend generally parallel to the body portion of the support member;

FIG. 11A is a side view of the self-reinforcing clip of FIG. 11;

FIG. 11B is a side view of the self-reinforcing clip of FIG. 11;

FIG. 11C is a cross-sectional side view of the self-reinforcing clip of FIG. 11.

DESCRIPTION OF THE EXAMPLE EMBODIMENTS

Figure 12:
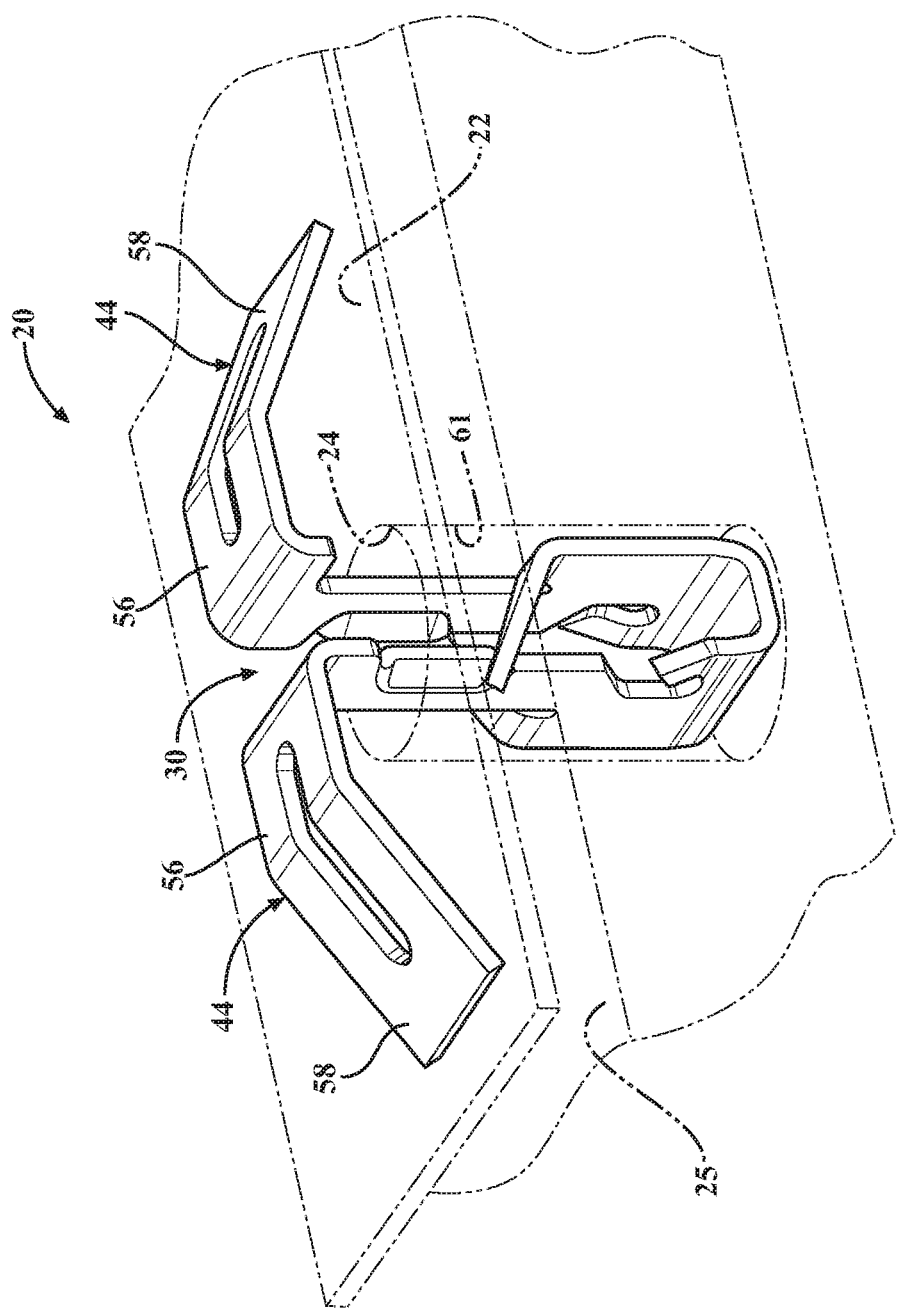
FIG. 12 is a perspective view of an example embodiment of a self-reinforcing clip positioned in a hole and securing a panel to a component.

Referring to the Figures, wherein like numerals indicate corresponding parts throughout the several views, a self-reinforcing clip 20 is generally shown for securing a panel 22 to a hole 24 defined by a supporting surface 25 on a component. More specifically, as generally shown in FIG. 12, when the clip 20 is employed, the panel 22 is positioned between the clip 20 and the supporting surface 25, and the clip 20 is fastened to the supporting surface 25 in the hole 25 to secure the panel 22 to the supporting surface 25. It should be appreciated that objects other than panels 22 could be secured to the supporting surface 25 by the subject clip 20. Further, the subject clip 20 could be utilized with various types of holes including, but not limited to, blind holes.

With reference to FIGS. 1-11C, the self-reinforcing clip 20 generally comprises a first support member 26 and a second support member 28, each disposed in spaced relationship with one another and defining a gap 30 therebetween. A base 32 interconnects the first and second support members 26, 28. Each of the support members 26, 28 have a body portion 42 and a flange portion 44, with the flange portions 44 extending outwardly away from one another. At least one tooth 60 extends outwardly from the body portion 42 of at least one of the support members 26, 28 and upwardly toward the flange portion 44 for engaging an inner wall 61 of the hole 24 to resist removal of the reinforcing clip 20 from the hole 24. At least one of the support members defines a contact surface 64. Further, at least one cross-over member 68, 84 is coupled to at least one of the support members 26, 28 and extends across the gap 30 past the body portion 42 of the other support member 26, 28 in alignment with the contact surface 64 on the other support member 26, 28 for engaging the contact surface 64 to inhibit movement of the support members 26, 28 toward one another when upward forces attempt to pull the clip 20 from the hole 24. It should be appreciated that all of the components of the clip 20 could be made of a single piece of material such as a metal.

More particularly, the base 32 has a generally U-shape to allow it to be inserted into the hole 24. The base 32 has a planar platform 34 that has a front edge 36 and a rear edge 38 that are disposed in parallel relationship with one another. The base 32 further has a pair of side bends 40 that each have an arc-shape that extend from the platform 34 between the front and rear edges 36, 38. It should be appreciated that the platform 34 does not have to be planar, e.g., it could have an arc-shape.

Each of the body portions 42 of the support members 26, 28 is connected to one of the side bends 40 of the base 32 and extends to a distal bend 46. The distal bends 46 of the two support members 26, 28 are oriented such that they slope outwardly away from one another. The body portions 42 are generally planar and are disposed in spaced and parallel relationship with one another. It should be appreciated that the body portions 42 do not have to be planar and could extend in at an angle relative to one another.

The body portions 42 further each have an inside surface 48 and an outside surface 50 that extend between a first edge 52 and a second edge 54. The inside surfaces 48 are oriented such that they face one another other. The first and second edges 52, 54 may define a stepped structure 57 integrated therein adjacent to each of the flange portions 44 that allows the clip 20 to be fitted to a narrow range of hole sizes. More specifically, the stepped structure 57 may space at least a portion of either of the edges 52, 54 inwardly toward the opposing edge 52, 54. Further, as shown in the embodiments of the clip 20 presented in FIGS. 1-3A, the second edges 54 of the body portions 42 may define an angled region 59 adjacent to the flange portion 44 that is angled generally toward the opposing support member 26, 28. It should be appreciated that the angled region 59 could at extend at various angles.

The flange portions 44 of the support members 26, 28 each extend from the distal bend 46 of the body portion 42 such that they extend away from one another. Each of the flange portions 44 extends from a first section 56 to a second section 58 and terminates at a terminal end 55. It should be appreciated that the terminal end 55 could have various shapes including, but not limited to, tapered, rounded, flat, sharp, barbed and squared-off shapes.

The first and second sections 56, 58 are each planar, and the second section 58 extends at a downward angle relative to the first section 56 such that the second section 58 spaces the first section 56 from the panel 22 or supporting surface 25. It should be appreciated that the sections 56, 58 do not have to be planar, could extend at various angles relative to one another, and the junction between the two sections 56, 58 may be angular or defined by a bend/curve.

By spacing the first section 56 from the panel 22 or supporting surface 25 by way of the second section 58, the flange portions 44 function as a spring to prevent rattling or other movement of the clip 20. This spaced relationship also provides a gap between the first section 56 and the panel 22 through which a removal tool may be inserted.

As illustrated in the embodiments of the clip 20 shown in FIGS. 1-8G, the flange portions 44 may further include one or more slots 66 extending therethrough. The slots 66 may be utilized to receive a tool, such as calipers, to compress the support members 26, 28 toward one another. It should be appreciated that such movement may ordinarily only occur after the cross-member 68, 84 has been damaged or otherwise removed from the subject self-reinforcing clip 20 because the cross-member 68, 84 would inhibit such movement.

The at least one tooth 60 extends outwardly and upwardly from the body portion 42 of at least one of the support members 26, 28. The tooth 60 tapers to a tip for engaging and digging into an inner wall 61 of the hole 24 to resist removal of the reinforcing clip 20 from the hole 24 when the clip 20 is exposed to external forces. In the embodiments shown in FIGS. 1-7 and 12, a single tooth 60 extends from each of the body portions 42 of the support members 26, 28 from a location adjacent to the base 32. Further, in the embodiments shown in FIGS. 8-11c, a pair of teeth 60 extend from the first body portions 42 of the support members 26, 28 in vertical alignment with one another. It should be appreciated that any number of teeth 60 could be employed on either of the support members 26, 28, and they could be positioned in various locations.

The at least one cross-member 68, 84 is coupled to the one of the support members 26, 28 and extends across the gap 30 past the body portion 42 of the first support member 26. The cross-member 68, 84 is disposed in alignment with at least one contact surface 64 on the first support member 26 for inhibiting movement of the support members 26, 28 toward one another. As will be explained in greater detail below, the contact surface(s) 64 may be located at various locations on the support members 26, 28.

In the example embodiments presented in FIGS. 1-7 and 12, the at least one cross-member 68, 84 includes a pair of barbs 68 that each extend outwardly from one of the body portions 42 of the support members 26, 28 and upwardly toward the flange portion 44. It should be appreciated only one, or any other number of barbs 68 could be employed. Furthermore, it should be appreciated that the barbs 68 could extend from the body portions 42 at any angle.

Each of the barbs 68 have an upper face 70 and a lower face 72 that extend between a pair of borders 74. The borders 74 taper to a point as they extend from the body portion 42. Similar to the previously described teeth 60, the pointed shape and angled orientation of the barbs 68 allows the barbs to be forced into the inner wall 61 of the hole 24 upon the application of external forces against the clip 20 or panel 22. As such, the more that the clip 20 is pulled upwardly out of the hole, the greater the force that is applied against the inner wall 61 by the barbs 68.

Each of the barbs 68 extend past the opposing body portion 42, thus defining a generally X-shaped configuration of the barbs 68. Furthermore, each of the barbs 68 are disposed in alignment with the one or more contact surfaces 64 of one of the support members 26, 28 for engaging the contact surface 64 when upward forces attempt to pull the clip 20 from the hole 24. Such contact inhibits the movement of the support members 26, 28 toward one another. As such, the barbs 68 continue to press into the contact surface 64 on the opposing support member 26, 28 (and into the inner wall 61 of the hole 22) upon the application of external upwardly directed forces against the clip 20 or panel 22, thereby increasing the structural rigidity of the clip 20. If desired, the support members 26, 28 may be drawn together after bending or breaking the barbs 68 by way of a tool.

With reference to the embodiment of the clip 20 presented in FIGS. 1-1G, the first edge 52 of the body portion 42 of each of the support member 26, 28 includes a linear portion 69 that extends downwardly along a plane and defines the contact surface 64. One of the borders 74 of the barb 68 is disposed in alignment with the contact surface 64. As such, the border 74 of the barb 68 may engage the first edge 52 of the body portion 42 when upward forces attempt to pull the clip 20 from the hole 24, and thus movement of the support members 26, 28 toward one another is inhibited.

With reference to the embodiments of the clip 20 presented in FIGS. 2-7, a stopping projection 76 extends from the first edge 52 of the body portion 42 and defines the contact surface 64. The lower face 72 of the barb 68 is disposed in alignment with the contact surface 64 on the stopping projection 76. As such, the lower face 72 of the barb 68 may engage the contact surface 64 on the stopping projection 76 when upward forces attempt to pull the clip 20 from the hole 24, and thus movement of the support members 26, 28 toward one another is inhibited. As illustrated in FIGS. 2-7, the stopping projection 76 may have various shapes, including a tapered/rounded-off shape disclosed in FIGS. 2-2A, a tapered shape with sharp edges as shown in FIG. 3, and a generally rectangular shape as shown in FIGS. 4-7.

With reference to the embodiments of the clip 20 presented in FIGS. 4-7, in addition to being defined by the stopping projection 76, the contact surface 64 of each support member 26, 28 is defined by the inside surface 48 of the body portion 42. Furthermore, a protrusion 80 extends from one of the borders 74 of the barb 68 in alignment with the contact surface 64 on the body portion 42. As such, the protrusion 80 of the barb 68 may engage the contact surface 64 on the body portion 42 when upward forces attempt to pull the clip 20 from the hole 24, thus further inhibiting movement of the support members 26, 28 toward one another. As illustrated in these Figures, the protrusion 80 may have various shapes, such as a quarter-circle shape as shown in FIG. 4, a generally square shape as shown in FIG. 5, a generally rectangular shape as shown in FIG. 6, and rounded-off shape disclosed in FIG. 7.

With more specific reference to the embodiment of the clip 20 shown in FIG. 7, the inside surface 48 of the body portion 42 defines a semi-spherical shaped indentation 82 that further defines the contact surface 64. Because of the shape of semi-spherical shape of the indentation 82, it is configured to direct the rounded protrusion 80 of the barb 68 therein toward the contact surface 64 when upward forces attempt to pull the clip 20 from the hole 24.

It should be appreciated that rather than engaging the contact surface 64 with the lower face 72 or border 74 of the barb 68 as described in the foregoing, the contact surface 64 could be engaged by the upper surface 74, a surface associated with a notch disposed in the barb 68, a surface associated with a groove defined in the barb 68, a surface associated with a raised area extending from the barb 68, a surface associated with a depression defined in the barb 68, or any combination of the contact regions described herein.

With reference to the embodiments of the clip 20 shown in FIGS. 8 to 11C, the at least one cross-over member 68, 84 is a bridge member 84 that extends along a horizontal segment 85 between a proximal segment 86 and a distal segment 88. In these embodiments, at least one of the proximal and distal segments 86, 88 are coupled with, or otherwise attached to the flange portion 44 of one of the support members 26, 28. The other of the proximal and distal segments 86, 88 is positioned such that it is aligned with a contact surface 64 defined by the flange portion 44 of the other support member 26, 28. As such, attempted movement of the support members 26, 28 toward one another is inhibited because at least one of the segments 86, 88 will engage the contact surface 64 during such attempted movement.

It should be appreciated that due to the position of the bridge member 84 over the flange portions 44, the bridge member 84 may easily be bent upwardly, or broken by a tool when desired to allow the support members 26, 28 to be moved toward one another, thus allowing the clip 20 to be removed from the hole 24.

With reference to the embodiments of the clip 20 shown in FIGS. 8 to 10C, the flange portion 44 of the second support member 28 defines a securement hole 90 that extends therethrough. The securement hole 90 is defined by a perimeter wall 92 in the flange portion 44 of the second support member 28. It should be appreciated that rather than extending all the way through the flange portion 44, the securement hole 90 could be configured as a recess.

Furthermore, the flange portion 44 of the first support member 26 defines a U-shaped cutout 96, 98 that extends from the second section 58 toward the distal bend 46. The cutout 96, 98 is defined by a pair of lateral walls 96 and a back wall 98 that extends between the lateral walls 96 on the first section 56 of the flange portion 44.

In these embodiments, the proximal segment 86 of the bridge member 84 is integrally connected to the back wall 98 of the first section 56 of the flange portion 44. Further, the distal segment 88 is non-fixedly received by the securement hole 90 of the second support member 28. In other words, the bridge member 84 is cantilevered to the back wall 98 and the distal segment 88 is freely received by the securement hole 90 such that the distal segment 88 may abut the perimeter wall 92 during attempted movement of the support members 26, 28 toward one another to inhibit movement of the support members 26, 28 toward one another.

With reference to the embodiments of the clip 20 shown in FIGS. 8-10c, the proximal segment 86 of the bridge member 84 has a U-shape and includes a pair of arms 102 and a crest 100 that interconnects the arms 102. The arms 102 extend generally perpendicularly to the body portions 42 of the support members 26, 28 and the crest 100 is pointed away from the distal segment 88. Further, one of the arms is integrally connected to the back wall 98 of the cutout 96, 98.

With more specific reference to the embodiment of the clip 20 shown in FIGS. 8-8G, the distal segment 88 of the bridge member 84 includes a single arm 102 that extends downwardly in generally parallel relationship to the body portion 42 and is received in the securement hole 90. As such, the arm 102 of the distal segment 88 is positioned to engage the perimeter wall 92 during attempted movement of the support members 26, 28 toward one another to inhibit movement of the support members 26, 28 toward one another.

With reference to the embodiment of the clip 20 shown in FIGS. 9-9A, the distal segment 88 of the bridge member 84 has a U-shape and includes a pair of arms 102 and a crest 100 that interconnects the arms 102. The arms 102 extend generally perpendicularly to the body portions 42 of the support member 26, 28 and the crest is 100 pointed toward the proximal segment 86. As such, the crest 100 of the distal segment 88 is positioned to engage the perimeter wall 92 during attempted movement of the support members 26, 28 toward one another to inhibit movement of the support members 26, 28 toward one another.

With reference to the embodiment of the clip 20 shown in FIGS. 10-10C, the distal segment 88 of the bridge member 84 has a U-shape and includes a pair of arms 102 and a crest 100. The pair of arms 102 each extend downwardly in parallel relationship to the body portions 42 of the support members 26, 28 inside the securement hole 90 and are interconnected by the crest 100, with the crest 100 points downwardly. As such, one of the arms 102 of the distal segment 88 is positioned to engage the perimeter wall 92 during attempted movement of the support members 26, 28 toward one another to inhibit movement of the support members 26, 28 toward one another.

With reference to the embodiment of the clip 20 shown in FIGS. 11-11C, the flange portions 44 of both the first and second support members 26, 28 defines a securement hole 90 extending therethrough. The proximal and distal segments 86, 88 of the bridge member 84 each have a U-shape and include a pair of arms 102 and a crest 100. The arms 102 each extend downwardly, in parallel relationship with the body portion 42 of the support members 26, 28 and are received by one of the securement holes 90. As such, one of the arms 102 of each of the proximal and distal segments 86, 88 are positioned to engage the perimeter wall 92 during attempted movement of the support members 26, 28 toward one another to inhibit movement of the support members 26, 28 toward one another. It should be appreciated that in this embodiment, the bridge member 84 is removable from the rest of the clip 20 since it is not fixedly connected to the support members 26, 28 at any point.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A self-reinforcing clip for securing a panel to a hole, comprising:
   a first support member and a second support member each disposed in spaced relationship with one another and defining a gap therebetween;
   a base interconnecting said first and second support members;
   each of said support members having a body portion and a flange portion with said flange portions of said support members extending outwardly away from one another;
   at least one tooth extending outwardly from said body portion of at least one of said support members and extending upwardly toward said flange portion for engaging an inner wall of the hole to resist removal of said clip from the hole;
   at least one of said support members defining a contact surface; and
   at least one cross-over member coupled to at least one of said support members and extending across said gap and past said body portion of the other of said support members and in alignment with said contact surface on the other of said support members for engaging said contact surface for inhibiting movement of said support members toward one another when upward forces attempt to pull the clip from the hole.

2. A self-reinforcing clip as set forth in claim 1 wherein said at least one cross-over member includes at least one barb extending outwardly from said body portion of said support member and upwardly toward said flange portion.

3. A self-reinforcing clip as set forth in claim 2 wherein said at least one barb includes a pair of barbs each extending from said body portion of one of said support members.

4. A self-reinforcing clip as set forth in claim 2 wherein said body portion of each of said support members has an inside surface and an outside surface that extend between a first edge and a second edge; said inside surfaces of said support members face one another; and said barb has a top surface and a bottom surface that extend between a pair of borders, wherein said borders of said barb taper as said barb extends from said body portion.

5. A self-reinforcing clip as set forth in claim 4 wherein said first edge has a linear portion that extends downwardly along a plane that defines said contact surface; and one of said borders of said barb is disposed in alignment with said contact surface defined by said first edge for engaging said first edge when upward forces attempt to pull the clip from the hole.

6. A self-reinforcing clip as set forth in claim 4 wherein a stopping projection extends from said first edge of said body portion; said contact surface is defined by said stopping projection; and said bottom surface of said barb is disposed in alignment with said contact surface on said stopping projection for engaging said stopping projection when upward forces attempt to pull the clip from the hole.

7. A self-reinforcing clip as set forth in claim 6 wherein said stopping projection has one of a tapered shape, a rounded-off shape and a squared-off shape.

8. A self-reinforcing clip as set forth in claim 6 wherein said contact surface is further defined by said inside surface of said body portion of said support member; a protrusion extends from one of said borders of said barb; and said protrusion is disposed in alignment with said contact surface on said inside surface of said body portion for engaging said contact surface when upward forces attempt to pull the clip from the hole.

9. A self-reinforcing clip as set forth in claim 8 wherein said inside surface of said body portion defines an indentation at said contact surface of said inside surface of said body portion for receiving said protrusion of said barb.

10. A self-reinforcing clip as set forth in claim 8 wherein said protrusion has one of a tapered shape, a rounded-off shape and a squared-off shape.

11. A self-reinforcing clip as set forth in claim 1 wherein said flange of one of said support members defines a securement hole extending therethrough and defined by a perimeter;
said contact surface is defined by said perimeter of said securement hole; and
said at least one cross-over member is a bridge member extending between a proximal segment and a distal segment, wherein said proximal segment is integrally connected to said flange of one of said support members and said distal segment is received by said securement hole for engaging said contact surface defined by said perimeter during attempted movement of said support members toward one another to inhibit movement of said support members toward one another.

12. A self-reinforcing clip as set forth in claim 11 wherein bridge member further has a horizontal member being planar extending between said proximal and distal segments.

13. A self-reinforcing clip as set forth in claim 11 wherein said proximal segment of said bridge member has a U-shape and includes a pair of arms extending generally perpendicularly to said body portions of said support members and defines a crest facing away from said distal segment of said bridge member and interconnecting said arms.

14. A self-reinforcing clip as set forth in claim 11 wherein said distal segment of said bridge member has a U-shape and includes a pair of arms and a crest wherein said pair of arms extend generally parallel to said body portion of said support member and said crest is pointed downwardly away from said flange portion and interconnects said arms.

15. A self-reinforcing clip as set forth in claim 11 wherein said distal segment of said bridge member has a U-shape including a pair of arms and a crest wherein said pair of arms extend generally perpendicularly to said body segment and said crest is pointed away from said proximal segment and interconnects said arms.

16. A self-reinforcing clip as set forth in claim 11 wherein said distal segment of said bridge member includes an arm extending downwardly in generally parallel relationship with said body member.

17. A self-reinforcing clip as set forth in claim 11 wherein said flange portion each of said support members defines a securement hole extending therethrough and defined by a perimeter;
said contact surface includes a pair of contact surfaces each defined by said perimeter of one of said securement holes;
said at least one cross-over member is a bridge member extending between a proximal segment and a distal segment; and
said proximal segment and said distal segment of said bridge member are each received by one of said securement holes for engaging said contact surfaces defined by said perimeter of said securement hole during attempted movement of said support members toward one another.

18. A self-reinforcing clip as set forth in claim 17 wherein said proximal and distal segment each have a U-shape and include a pair of arms and a crest wherein said pair of arms extend perpendicularly to said body segment and said crest interconnects said arms and is pointed downwardly away from said flange portion.

19. A self-reinforcing clip as set forth in claim 17 wherein bridge member further defines a horizontal member being planar extending between said proximal and distal segments.

20. A self-reinforcing clip as set forth in claim 1 wherein said flange portion of each of said support members extends from said body portion to a terminal end having one of a tapered shape, a rounded-off shape and a squared-off shape.

21. A self-reinforcing clip as set forth in claim 1 wherein said flange portion of each of said support members extends from said body portion along a first section and a second section; said second section is angled downwardly relative to said first section at a junction to define a gap between said first section and the panel and to provide resiliency to said flange portion; and said junction between said panels has one of an angular or curved shape.

22. A self-reinforcing clip as set forth in claim 1 further including a stepped structure integrated into said body portion of each of said support members adjacent to each of said flange portions to allow said clip to be fitted to a narrow range of holes sizes.

* * * * *